United States Patent [19]

Shaw et al.

[11] Patent Number: 5,736,988
[45] Date of Patent: Apr. 7, 1998

[54] APPARATUS AND METHOD FOR ACCELERATED TILED DATA RETRIEVAL

[75] Inventors: Robert Allen Shaw, Los Altos; Peter R. Birch, San Francisco; John C. Lin, Cupertino; Michael B. Nagy, San Ramon, all of Calif.

[73] Assignee: Silicon Graphics, Inc., Mountain View, Calif.

[21] Appl. No.: 567,083

[22] Filed: Dec. 4, 1995

[51] Int. Cl.$^6$ ............................................. G06T 17/30
[52] U.S. Cl. ............................................. 345/423
[58] Field of Search ............................. 395/123, 124, 395/125

[56] References Cited

U.S. PATENT DOCUMENTS 5,276,783 1/1994 Fossum .................................... 395/123
5,307,450 4/1994 Grossman .............................. 395/123
5,581,673 12/1996 Kikuchi ................................. 395/123

*Primary Examiner*—Phu K. Nguyen
*Assistant Examiner*—Cliff N. Vo
*Attorney, Agent, or Firm*—Wagner, Murabito & Hao

[57] ABSTRACT

A method is used to access a sub-region of a two or more dimensional data region, in which said region is composed of a patchwork of individually addressable tiles. A hardware assisted mechanism is used to address, reformat, and composite data from each tile to produce a row-major subregion data stream to the consuming device. This method abstracts information about how the desired region is stored and addressed, so that further processing steps can process the data as a contiguous two or more dimensional space without regard to how the data is composited. This is particularly useful for doing image processing on graphics processing systems where source data is often stored in separately managed and addressed tiles.

19 Claims, 8 Drawing Sheets

APPARATUS AND METHOD FOR ACCELERATED TILED DATA RETRIEVAL

FIELD OF THE INVENTION

The present invention pertains to the field of data retrieval. More specifically, the present invention relates to an apparatus and method for efficiently retrieving tiled data from memory.

BACKGROUND OF THE INVENTION

Computer graphics involves the manipulation of graphical objects. Interactive computer graphics allows a user to input changes to a display. These changes are effectuated by the computer, which displays the resulting, modified images. For example, interactive computer graphics are being applied to video games, flight simulators, medical diagnostic displays, animated picture generators, computer-aided design, etc.

Images for use in computer graphics and image processing are typically stored in memory as large, multi-dimensional data sets. Common operations selectively accessing portions of these data sets for display or processing. In this manner, a computer may be used to interactively display multi-dimensional images. In order to more efficiently utilize computer resources, the data sets used to render these displays are often stored in the form of a collection of tiles and tiles. Each of these tiles and tiles are typically addressed and managed as a virtually contiguous region of address space. In other words, this memory management scheme treats a large data set as a series of smaller, contiguous tiles. Thereby, management issues, such as caching, virtual-to-physical mapping, swapping, etc. are more easily executed.

However, storing data in a tiled format-also causes several problems. In order to produce designed images, additional processing operations (e.g., convolution, zooming, decimation, scaling, etc.) are performed on these data sets. Some operations (e.g., convolution require that the data be presented as a stream of adjacent data elements. For a two-dimensional region, the data typically must be presented as a sequence of either rows or columns. For example, convolution processors often maintain several lines of buffer data when processing the stream. This allows for operations to be performed on neighborhoods of data (i.e., data elements related by locality to the current element being processed). Since these operations are performed on a stream of data, any instances of noncontiguous addressing or any unrelated data in the middle of the stream must be compensated. This requires additional overhead in terms of the pre-processing that must be performed to transform the information contained in the tiles into a continuous stream of data.

One solution to providing the data in a continuous stream is to transport the entire region of continuous data that encompasses the portion of data that is of interest. However, this approach is extremely inefficient because the address space involved could be many times the size of the space of the requested data. A more efficient mechanism would be to identify and then access only those specific portions of data that are of interest.

One prior art approach for accomplishing this goal, involved using a "scatter-gather" mechanism. The scatter-gather mechanism specifies to the retrieving device, information as to how it should traverse through the address space in order to construct the desired data stream. Such prior art mechanisms typically have a table which contains a list of each virtually contiguous segment of the image, as well as the length of that segment. However, there are two disadvantages with the scatter-gather approach. The first disadvantage is that building the table is a time-consuming and complex task. Hence, building the table significantly degrades the system's performance. Moreover, this table has to be regenerated for each region that is to be processed. The second disadvantage is the fact that due to data packing and alignment constraints, data unrelated to the desired region might reside within the boundary between two tiles. Hence, there must be a mechanism to ensure that each segment begins and ends at a certain, carefully specified alignment.

Another prior art approach is to treat the regions as a series of separate, smaller regions, which are aligned to the boundaries of the tile grid. This approach requires a striding-type retrieval mechanism. The retrieval mechanism must be capable of adding an offset to the current address at the end of a line so that it can determine the address of the beginning of the next line. However, this approach also has several associated disadvantages. First, multiple processing passes must be executed. And in spite of the fact that no unnecessary data is being processed, the overheads associated with an operation are multiplied by the multiple number of passes that are required. As a result, the overall performance and efficiency suffers. A second disadvantage is that for operations which require wide neighborhood data, such as convolution operations, the additional boundaries created by dividing the region to be processed, make the processing of data near the boundaries extremely difficult. In such cases, the neighboring data from adjacent tiles must be sent by some other mechanism. Having to perform this extra step is highly inefficient.

Therefore, due to the disadvantages inherent in the prior art, there is a need for a more efficient mechanism for the retrieval of tiled data—one which yields higher performance.

SUMMARY OF THE INVENTION

The present invention pertains to an apparatus for retrieving a specific region of data in a computer system having an addressable data source, wherein the data is stored as a collection of individually addressable tiles. The region of data is retrieved according to swaths of data which are comprised of rows of data. In turn, a row of data is comprised of segments of data. First, the tiles corresponding to the region are identified. This allows the retrieval apparatus to determine the base addresses. Next, the parameters of the region (e.g., amount of data until the end of the current tile, the amount of data until the end of the current row, the number of rows until the end of the current tile, the number of rows until the end of the region, and similar parameters for each additional dimension), are specified. Using this information, the retrieval apparatus retrieves segments of data according to their starting addresses and lengths. In the currently preferred embodiment, the segments are reformatted and realigned in order to remove unwanted data and to produce a contiguous stream of data. Thereby, a row of data can be retrieved by retrieving its corresponding segments. Likewise, a swath of data is retrieved by retrieving its rows of data, and the region of data is retrieved by retrieving all of its relevant swaths of data.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An apparatus and method for tiled data retrieval is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Figure 1:
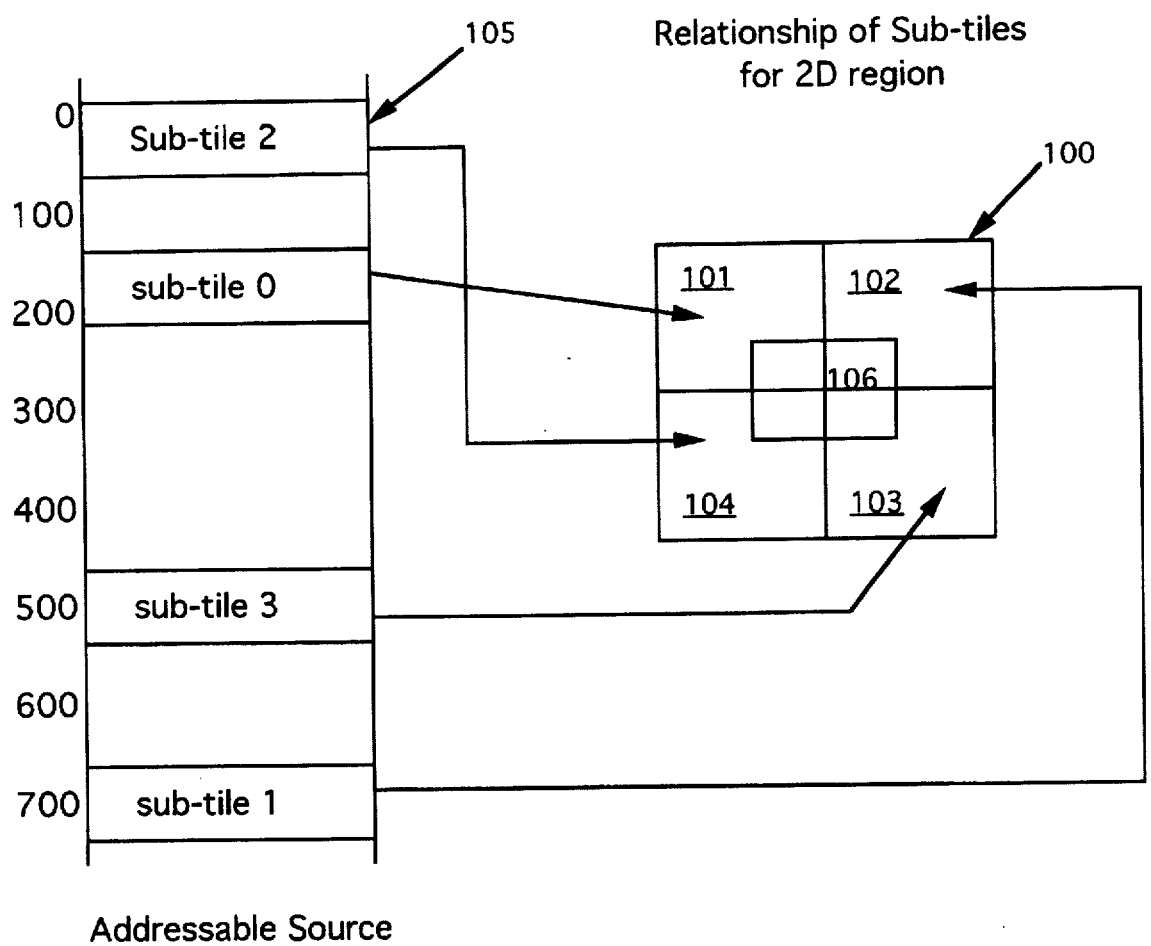
FIG. 1 shows a representation of a two-dimensional region which is divided into tiles for memory storage purposes.

The present invention addresses the problem of accessing a region of a two or more dimensional data set which is managed as a collection of individually addressable files. Although the following description is in reference to a two-dimensional display region, the present invention can also be applied to a multi-dimensional display region, whereby the data is stored in volumetric slices. FIG. 1 shows a representation of a two-dimensional region which is divided into tiles for memory storage purposes. The two-dimensional region 100 corresponds to the data used to display an image. Region 100 is broken into four separate tiles 101–104. These tiles 101–104 are stored in different locations of an addressable source 105. For example, tile 2 may be stored in address locations 0000 through 0090; tile 0 may be stored in address locations 0110 through 0200; tile 3 may be stored in address locations 0450 through 0540; and tile 1 may be stored in address locations 0660 through 0750. However, the entire stored image is not rendered for display at the same time. Only a small portion of interest 106 is rendered for display on the computer screen. For instance, region 100 might correspond to a landscape for a flight simulator, and region 106 corresponds to that portion of the landscape that the aircraft is currently flying over.

Figure 2:
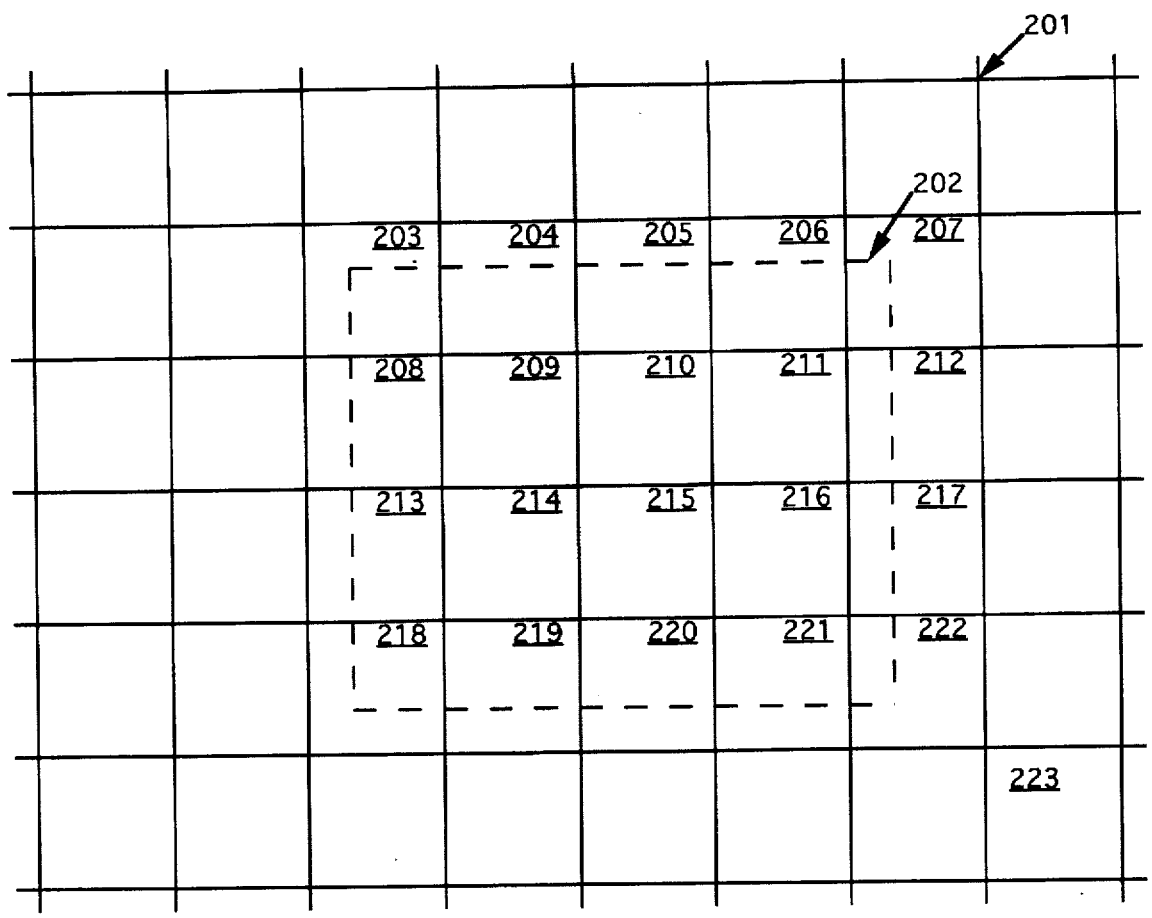
FIG. 2 shows a tiled source data and a region that has been designated for retrieval.

Referring to FIG. 2, a filed source data 201 and a desired region 202 are shown. Desired region 202 is comprised of the entirety of tiles 209–211 and 214–216 and portions of tiles 203–207, 208, 212, 213, 217, and 218–222. Tiles falling completely outside of region 202 are ignored (e.g., tile 223). In the present invention, the tiled data retrieval mechanism has information regarding the tiled nature of the data set. This information is used to calculate the appropriate address for each segment of each row in the desired region. In addition, the present invention solves the problem of unwanted data that may appear in the stream at tile boundaries. This is accomplished by reformatting and realigning the data based on the initial alignment of the data. In this manner, it is possible to deliver the desired region to the consuming device with minimal setup by the host processor, thereby improving efficiency.

Figure 3:
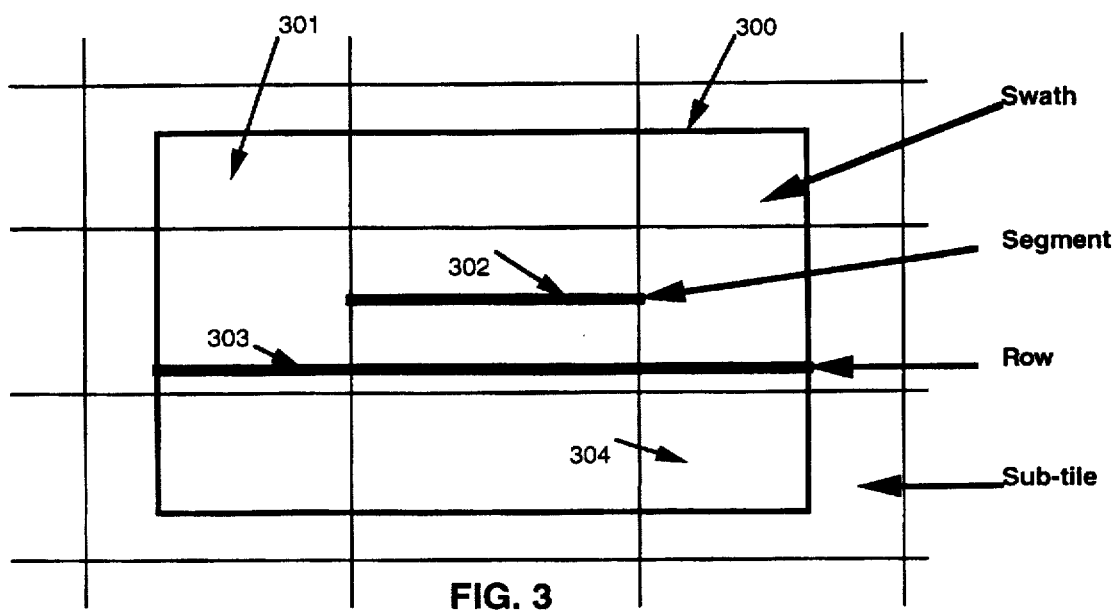
FIG. 3 shows a swath, a segment, a row, and a tile corresponding to a two-dimensional subregion.

In the currently preferred embodiment, address and length calculations and formatting are performed according to swaths, segments, rows, and tiles. FIG. 3 shows a swath 301, segment 302, row 303, and tile 304 corresponding to a two-dimensional subregion 300. A swath 301 corresponds to an image region that may cover portions of a number of tiles. Swath 301 extends the entire width and some height of region 300. A swath is comprised of a number of horizontal rows. A swath is defined as the area that the region covers within a row of tiles. A row extends horizontally across the width of subregion 300 and has a unit thickness. A segment 302 is a horizontal piece of a row which does not cross any tiles vertically. The image region is comprised of a number of rectangular tiles.

Figure 4:
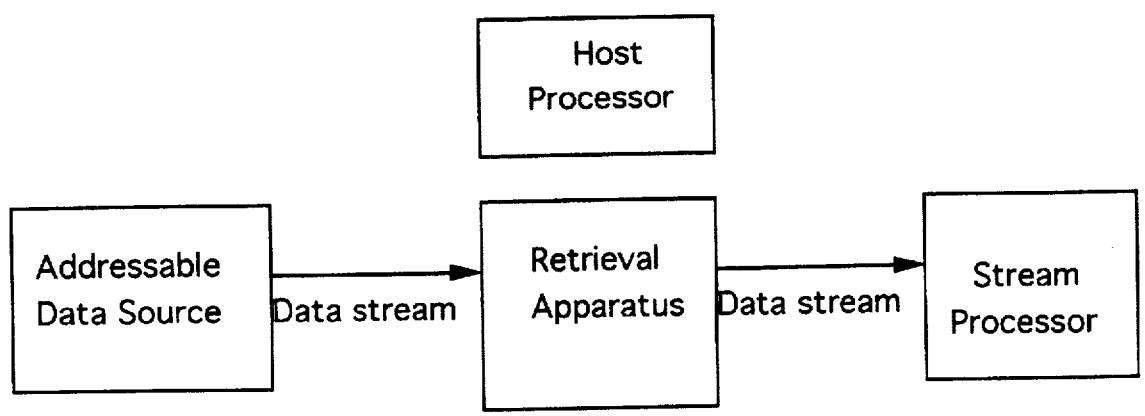
FIG. 4 shows a block diagram of the accelerated data retrieval mechanism of the present invention.

FIG. 4 shows a block diagram of the accelerated data retrieval mechanism of the present invention. Initially, at the start of the data retrieval process, the host processor 401 defines the parameters of the transfer. First, each tile which is involved in the desired sub-region is identified. This allows the retrieval apparatus 402 to identify the base address for each tile within the addressable data source 403. Next, the parameters of the region itself, including the size in each dimension and the beginning offset, are sent by host processor 401 to the retrieval apparatus 402.

Based on this information, the retrieval apparatus 402 begins determining the locations in the addressable data source 403 for each contiguous section or segment of data. Address changes are determined from a series of counters. It is the function of these counters to keep track of the amount of data remaining until the end of the current tile is reached. These counters also track the number of rows remaining until the end of the tile is reached, as well as the number of row corresponding to the end of the region. And in the case for three or more dimensional data, the counters maintain similar information for each of the dimensions. Retrieval apparatus 402 then retrieves each segment of data by using the counters and tile parameter information to determine the addresses and lengths corresponding to each segment.

As the data is retrieved by retrieval apparatus 402 from addressable data source 403, the data may need to be reformatted before being sent to the downstream processor 404. In those instances where the addressable data element is larger than the data size of the data set, additional data might be included in the stream. This additional data is unwanted and must be removed. As an example, in a memory system where data is accessible as doublewords (i.e., eight bytes of data), but the data set being addressed has only one byte per element, a segment could end at a point other than the end of a doubleword boundary. Since only doublewords can be addressed, additional bytes will be included in the stream. These additional bytes must be removed. This is accomplished as follows. The retrieval apparatus 402 identifies such problem cases by comparing the beginning and ending alignment of a segment relative to the size of the data elements in the addressable source. If there is not an exact alignment, data is shifted within the stream so that the unwanted additional data is removed. This shifting process is applied to the entire segment, so that there are no gaps in the resultant data stream. This packed stream is then sent to the downstream device 404.

Figure 5:
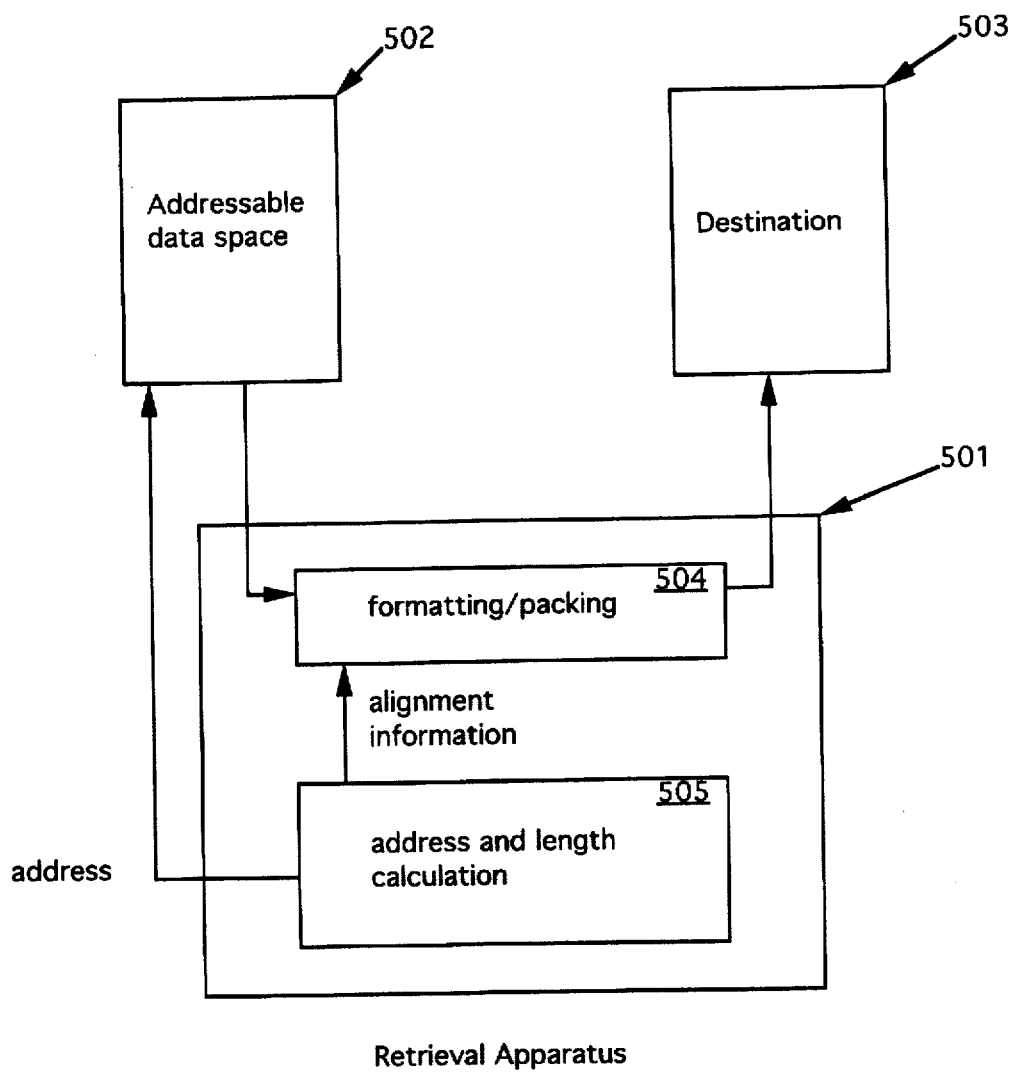
FIG. 5 shows a more detailed block diagram of the retrieval apparatus.

FIG. 5 is a more detailed block diagram of the retrieval apparatus. The retrieval apparatus 501 is comprised of a formatting/packing block 504 and an address and length calculation block 505. The host processor supplies retrieval apparatus 501 with information pertaining to the region to be retrieved and information regarding the swaths comprising that region. Block 505 uses this information to calculate the addresses and lengths of each segment of each row for all of the swaths corresponding to the specified region. Block 505 also generates and sends alignment information to the formatting/packing block 504. Once the address of a segment is calculated by block 502, that particular segment is retrieved from addressable data space 502 and input to formatting/packing block 504. The retrieved segment is aligned and any boundary artifacts are removed by the formatting/packing block 504 before being sent on to the destination 503. This process is repeated until all segments which make up the requested region are retrieved and properly aligned.

Figure 6:
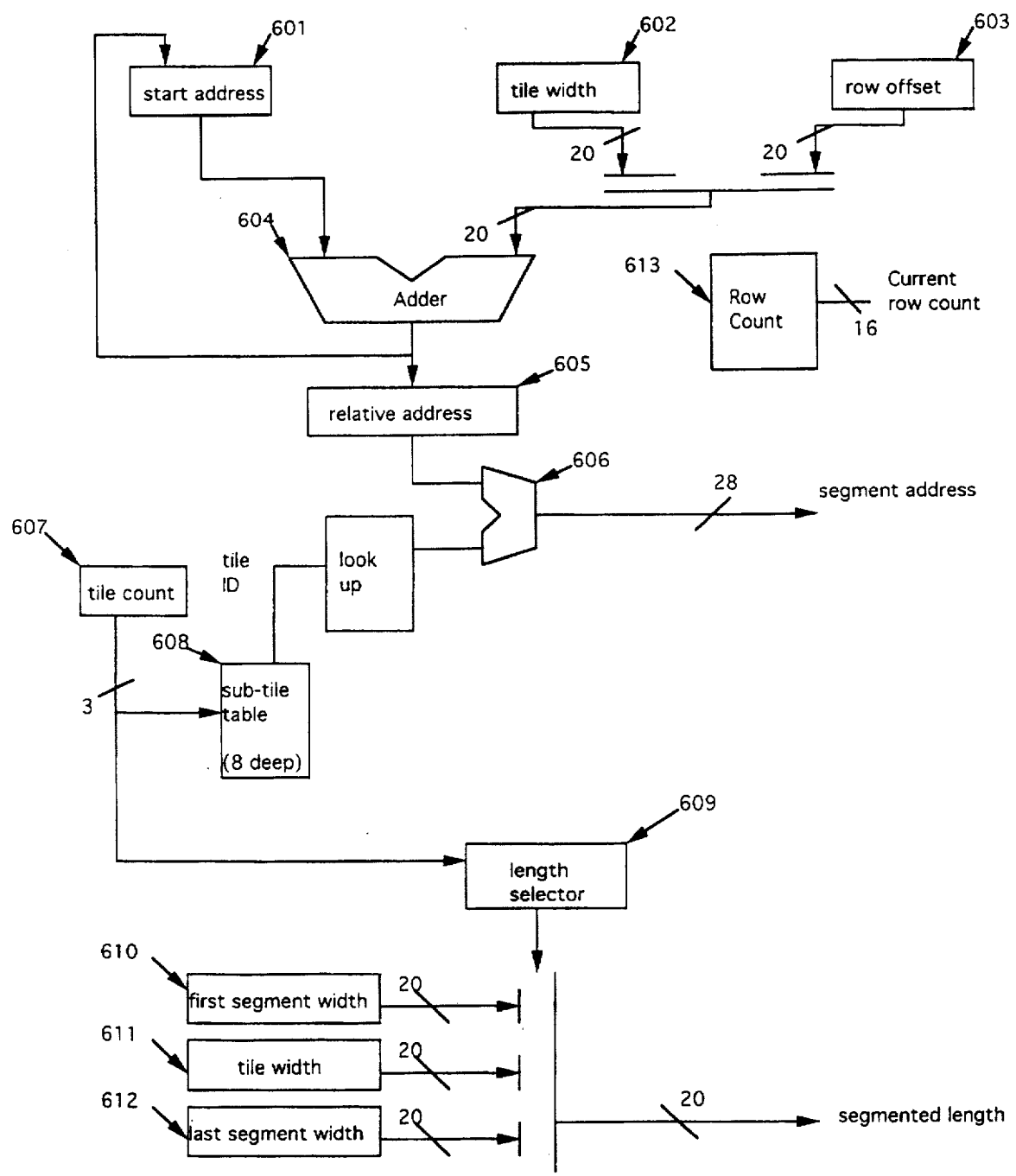
FIG. 6 is a circuit diagram of the circuit that generates the address and length calculations.

FIG. 6 is a circuit diagram of the circuit that generates the address and length calculations. Adder 604 adds the contents of the start address register 601 to either the contents of the tile width register 602 or the row offset register 603 to produce the tile relative address. A multiplexer selects between the contents of registers 602 and 603 for input to adder 604. The tile relative address of the adder's output is stored into register 605, and it is also loaded back into start address register 601 in anticipation of the next address generation. The tile relative address is used to calculate the segment address by adding it to the tile address. The tile address is found by indexing the tile count stored in counter 607 to a tile table 608. Adder 606 performs the addition of the tile relative address to the tile address in order to generate the segment address. The tile count stored in counter 607 is also used to control length selector 609. Length selector 609 is used to select amongst either the output value from the first segment width register 610, the tile width register 611, or the last segment width 612 as the segment length. Lastly, the current row count is tracked by a row counter 613.

Once a segment is retrieved, it is formatted and aligned in order to compensate for any boundary artifacts. Boundary artifacts might occur whenever a segment is misaligned. Any misalignments are compensated for by shifting the segment either to the right or to the left, depending on where the misalignment occurred, by the appropriate number of bytes. This eliminates any unwanted data occurring at the beginning or ending of a misaligned segment. The next segment may also be shifted in order to pack the data so as to form a continuous, uninterrupted stream. For example, the end of a retrieved segment might occupy only the first four bytes of an eight-byte wide doubleword. In this case, the void resulting from the elimination of the four unwanted bytes is filled by shifting the next four bytes of valid data from the next segment into this void, thereby effectively repacking the segment into a continuous stream of valid data without having any boundary artifacts.

Figure 7:
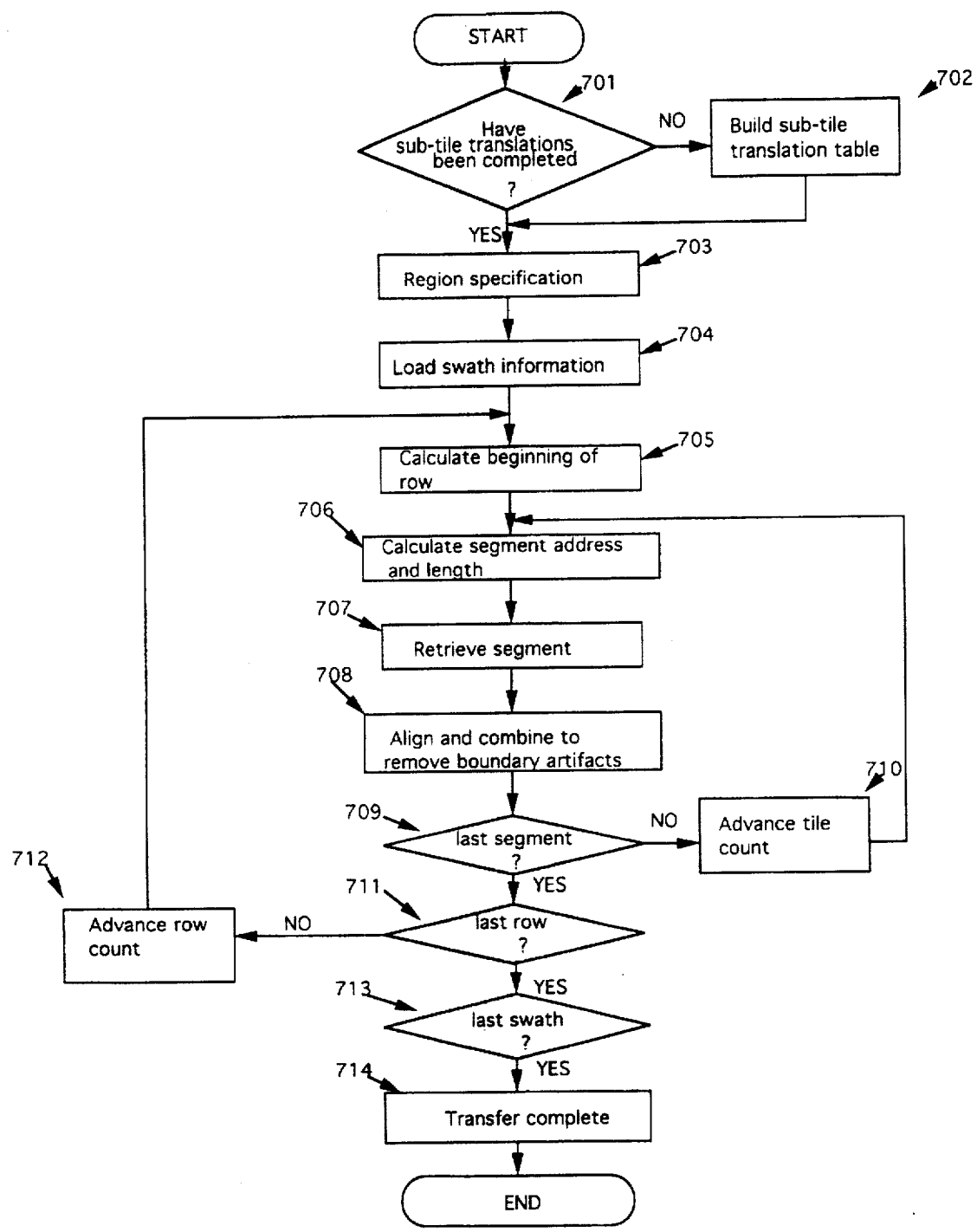
FIG. 7 is a flowchart describing the steps for retrieving tiled data.

FIG. 7 is a flowchart describing the steps for retrieving tiled data. Initially, in steps 701 and 702, a tile translation table is built for performing tile address translations. This table is built only once when the tiled region is defined. This translation table can be used for all sub-region transfers within the larger region. Next, information corresponding to a region for retrieval is specified, step 703. The swath information is, likewise, loaded in step 704. This information includes the tile width, row width, row offset (i.e., the number of bytes of offset of the first row), row start address (i.e., the address, in bytes, relative to the beginning of the tile where the first row begins), the number of rows in a swath, and the tiles that are accessed by a particular swath. Once this information is loaded into the retrieval apparatus, the beginning of a row is calculated, step 705. The segment address and length corresponding to that particular row is calculated, step 706. The specified segment of data is then retrieved, step 707. In step 708, the segment data is properly aligned and combined to remove any boundary artifacts.

Thereupon, a determination is made as to whether that was the last segment in that row, step 709. If that was not the last segment, the tile count is advanced by one, step 710, and steps 706–709 are repeated. However, if the last segment for that particular row has been retrieved, step 711 is executed. In step 711, a determination is made as to whether that was the last row of that particular swath. If that was not the last row, the row count is advanced by one, step 712, and steps 705–711 are repeated. Otherwise, a determination is made as to whether the last swath has been retrieved, step 713. If there are additional swaths to be retrieved, steps 704–713 are repeated for each additional swath. Otherwise, the data transfer is complete, step 714.

Figure 8:
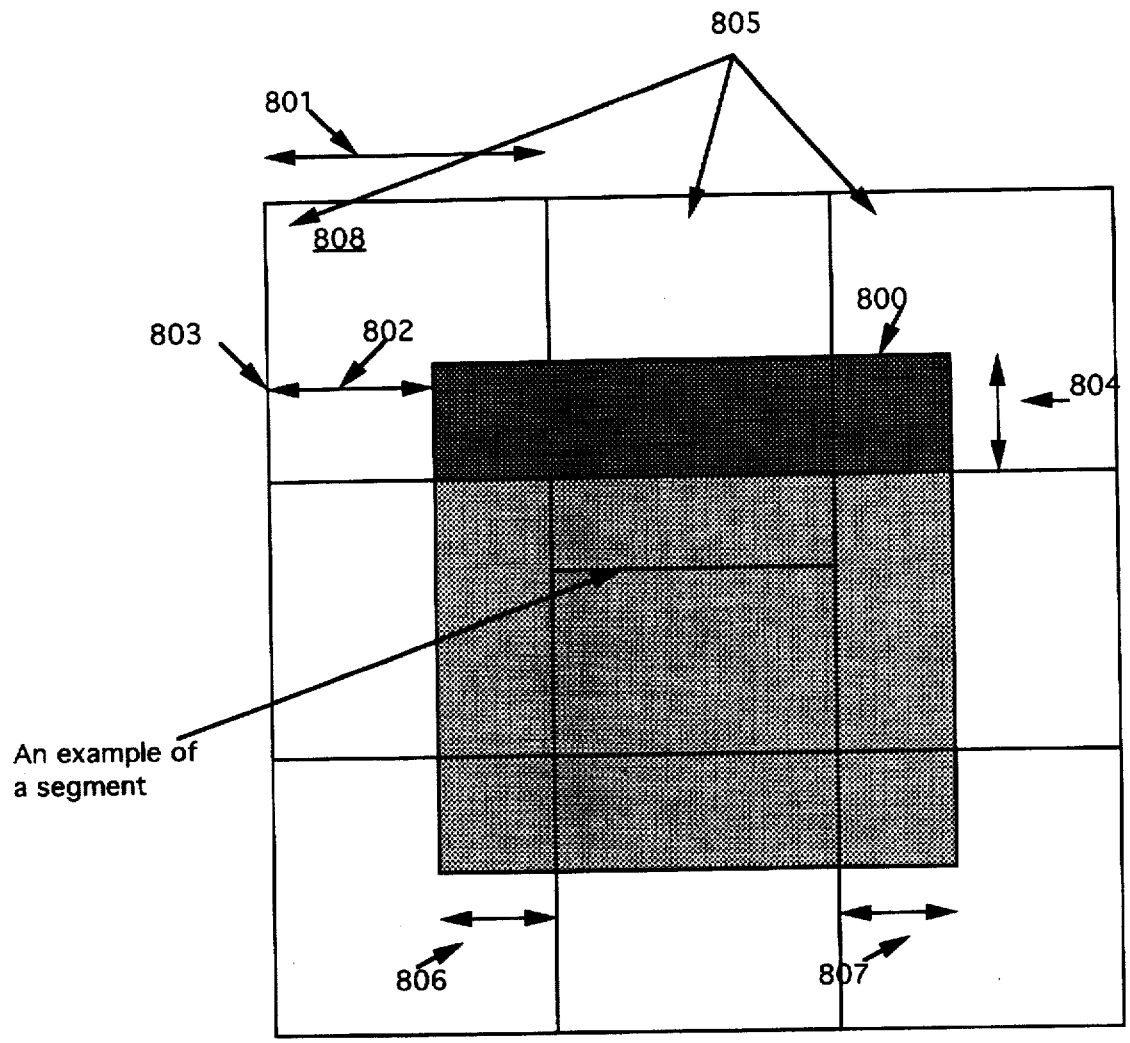
FIG. 8 shows an example of a region of interest and its corresponding parameters that are required for its retrieval.

An example is now offered to demonstrate the retrieval of a region. FIG. 8 shows an example of a region 800 that has been designated for retrieval. Seven parameters are required in order so that region 800 can be retrieved. The first parameter 801 corresponds to the width of a tile. The second parameter 802 gives the row offset. The third parameter 803 is the row start address. The fourth parameter 804 specifies the row count (i.e., the height of the swath). The fifth parameter 805 gives the ID numbers of the tiles. The sixth parameter 806 specifies the width of the row's first segment, and the last parameter 807 gives the width of the row's last segment.

Initially, the starting address corresponding to the upper left corner of region 800 is determined. This is accomplished by first adding the row start address 803 to the row offset 802. Row start address 803 gives the offset from the top of tile 808, and row start address 802 gives the offset from the left edge of tile 808. Adding these two values gives the upper-left corner address of region 800 relative to tile 808. The absolute address is determined by adding the tile-relative address to the address corresponding to tile 808. The address corresponding to tile 808 is found by referencing the ID number 805 of tile 808 in a lookup table. The ending address corresponding to the first segment of the first row is then determined by adding the width of the row's first segment 806 to the absolute starting address.

The starting address for the next segment (i.e., the middle segment) of the first row is determined in the same manner as described above, except that information pertaining to tile 809 is used instead of the tile 808 information. The offset is zero for tiles other than the first. The ending address of the next segment is, likewise, calculated as described above, except that the width of a tile 801 is used in place of the width of the row's first segment 806. The starting address for the last segment (e.g., the third segment) of the first row is determined in the same manner as described above, except that information pertaining to tile 810 is used instead. The ending address of the last segment is calculated as described above, except that the width of the row's last segment 807 is used instead.

Once the first row has been retrieved, the row start address 803 is iterated so that it is stepped down by one unit (i.e., one row) in tile space. The starting and ending addresses of each of the segments corresponding to the new row are calculated in the same process as described above. This process is repeated for each successive row until the row count 804 is reached. Row count 804 indicates that the entire first swath has been retrieved. Thereupon, new parameters corresponding to the next swath are loaded, and the process continues until all swaths of region 800 have been retrieved. It should be noted that in the currently preferred embodiment, these address calculations are performed in the virtual address space and then translated into the physical address space.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for retrieving a region of data stored in memory in a tiled format, the method comprising the steps of:

specifying a number of tiles containing the data;

loading parameters corresponding to a portion of data contained within the region, wherein the portion is comprised of a plurality of rows and the rows are comprised of a plurality of segments;

calculating addresses of the segments based on the parameters that were loaded;

retrieving one row of data by retrieving the segments corresponding to that row;

retrieving the portion of data by retrieving all rows corresponding to that portion;

retrieving the region of data by retrieving all portions corresponding to that region.

2. The method of claim 1 further comprising the steps of:

determining whether a retrieved segment contains superfluous data, wherein if there is superfluous data:

shifting the retrieved segment to eliminate the superfluous data;

shifting in a portion of a following segment in place of the superfluous data.

3. The method of claim 1, wherein the parameters include a tile width, a row offset, a row start address, a row count, a width of a first segment of one of the rows, and a width of a last segment of the row.

4. The method of claim 3 further comprising the step of determining a starting address of a first segment of the region by:

adding the row start address to the row offset to produce a relative address;

adding the relative address to a tile address to produce the starting address.

5. The method of claim 4 further comprising the step of determining an ending address of the first segment by adding the starting address to width of the first segment.

6. The method of claim 4, wherein the tile address is determined by indexing a tile identification number to a lookup table.

7. The method of claim 3, wherein a last row of the portion to be retrieved is determined by a line count.

8. The method of claim 1, wherein the region of data corresponds to a two-dimensional display.

9. The method of claim 1, wherein the region of data corresponds to a multi-dimensional display.

10. The method of claim 1 further comprising the step of a two-dimensional matrix of tile identifications.

11. In a memory system having an addressable data source wherein data is stored in a tile format, an apparatus for retrieving a particular segment of the data, comprising:

a first register for storing a starting address corresponding to a first row of data of the specified portion of data;

a second register for storing a width of a tile;

a third register for storing a row offset;

a first multiplexer coupled to the second register and the third register for selecting either the width of a tile or the row offset;

a first adder coupled to the first register and the multiplexer, wherein the adder adds the starting address to either the width of the tile or the row offset;

a second adder coupled to the first adder for adding a tile address to the output of the first adder to produce an address corresponding to the segment;

a second multiplexer for selecting between a first segment width, a tile width, and a last segment width for output as a segment length;

a length selector coupled to the second multiplexer for controlling the second multiplexer, wherein the segment is retrieved according to the segment address and the segment length.

12. The apparatus of claim 11 further comprising a shifter for shifting out unnecessary bits of data from the segment.

13. The apparatus of claim 11 further comprising a counter for storing a number of rows corresponding to a swath of data.

14. The apparatus of claim 11 further comprising a lookup table coupled to the second adder for outputting the tile address according to a tile count.

15. The apparatus of claim 11 further comprising:

a fourth register coupled to the second multiplexer for storing the first segment width;

a fifth register coupled to the second multiplexer for storing the tile width;

a sixth register coupled to the second multiplexer for storing the last segment width.

16. The apparatus of claim 11, wherein the addressable data source corresponds to a two-dimensional display.

17. The apparatus of claim 11, wherein the addressable data source corresponds to a multi-dimensional display.

18. In a computer system having an addressable data source wherein data is stored as a series of tiles, a method for retrieving a specific portion of data from certain tiles, comprising the steps of:

a) specifying parameters corresponding to a first swath of data, wherein the swath of data is comprised of a plurality of rows of data and a row of data is comprised of a plurality of segments of data;

b) calculating a beginning address and a length for each segment of one row of data corresponding to the first swath based on the specified parameters;

c) retrieving the segments corresponding to the row;

d) repeating steps b-c until all rows of data corresponding to the first swath have been retrieved;

e) specifying parameters corresponding to a next swath of data;

f) repeating steps b-d for the next swath of data until the next swath of data has been retrieved;

g) repeating steps e-f until the entire specific portion of data has been retrieved.

19. The method of claim 18 further comprising the steps of:

removing unwanted data in one segment of data;

packing the one segment of data with data from a subsequent segment.

* * * * *